United States Patent [19]

Spaude et al.

[11] 4,077,494

[45] Mar. 7, 1978

[54] GREASE GUN

[75] Inventors: Robin W. Spaude; Alvin L. Bowers, both of Granite Falls, Minn.

[73] Assignee: Parker-Hannifin Corporation, Cleveland, Ohio

[21] Appl. No.: 750,962

[22] Filed: Dec. 15, 1976

[51] Int. Cl.² ............................................. F16N 3/12
[52] U.S. Cl. ................................. 184/105 A; 184/28; 222/256; 222/340; 222/380; 222/383
[58] Field of Search ............... 184/105 A, 105 R, 28, 184/38 R; 417/489; 222/380, 256, 383, 326, 260, 340

[56] References Cited

U.S. PATENT DOCUMENTS

| 1,758,250 | 5/1930 | Davis | 222/256 X |
|---|---|---|---|
| 1,894,274 | 1/1933 | Jacques | 222/256 |
| 1,905,878 | 4/1933 | Albertine | 222/256 |
| 2,027,500 | 1/1936 | Vanderlip | 222/383 |
| 2,218,363 | 10/1940 | Sundholm | 222/383 |
| 2,394,488 | 2/1946 | Rotter et al. | 222/340 |
| 2,425,867 | 8/1947 | Davis | 184/28 X |
| 2,521,569 | 9/1950 | Davis | 222/256 |
| 3,038,768 | 6/1962 | Kludt | 222/256 X |
| 3,231,147 | 1/1966 | Leahy | 222/380 X |

FOREIGN PATENT DOCUMENTS

| 714,147 | 8/1954 | Canada | 222/383 |
|---|---|---|---|
| 1,441,369 | 4/1966 | France | 184/105 A |

Primary Examiner—David H. Brown
Attorney, Agent, or Firm—Donnelly, Maky, Renner & Otto

[57] ABSTRACT

A grease gun of the type wherein a dispensing head assembly having a lever-operated piston pump is screwed onto the head end of a grease-containing cylinder and wherein a spring-biased plunger and rod assembly in said cylinder is operative to feed grease from the cylinder to the pump, said dispensing head assembly being characterized in that the head cap thereof has diametrically opposite holes through the side wall thereof in which a pump cylinder of circular cross section is firmly supported, in that a sheet metal clevis for a link of the pump-operating lever has its base secured as by welding on the end wall of the head cap, and in that a check valve body is secured in a cross bore adjacent the closed end of the pump cylinder and extends through aligned holes in the head cap end wall and the clevis base to provide a pump outlet to which the grease dispensing tube is connected, said check valve body having a shoulder engaging the clevis base to prevent breaking away of the clevis from the head cap end wall even when large forces are applied on the clevis by the link of the pump-operating lever.

4 Claims, 3 Drawing Figures

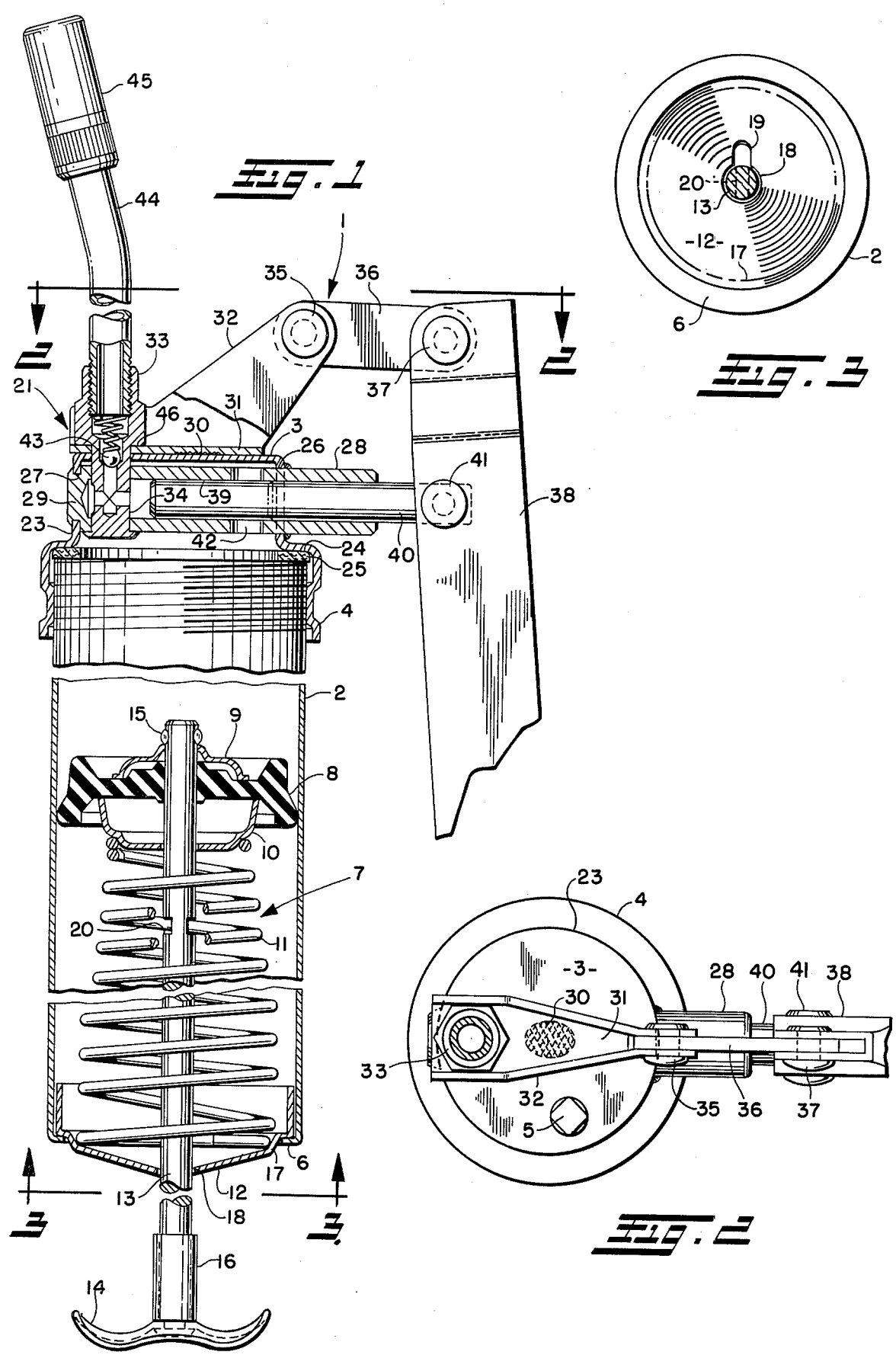

GREASE GUN

BACKGROUND OF THE INVENTION

In known forms of lever-operated grease guns as disclosed, for example, in the U.S. Pat. Nos. 2,923,443, 2,941,854, and 3,780,830 it is a prevalent practice to weld a square cross-section pump cylinder diametrically across the exterior of the end wall of the head cap and to provide a transverse pivot pin at the closed end of the pump cylinder for a pair of links of the pump-operating lever. When high pressure is applied on the grease by the pump piston, the resulting large tensile forces applied on the aforesaid links tends to break the pump cylinder away from the end wall of the head cap. It has been proposed as in U.S. Pat. No. 3,627,178 to make a portion of the pump cylinder of round bar stock but in that case the end wall of the head cap is formed with axial projections which provide a concave cylindrical seat in which the round portion of the pump cylinder is welded.

In the grease guns according to U.S. Pat. Nos. 2,923,443, 2,941,854 and 3,780,830, a check valve body is screwed into a lateral opening in the pump cylinder adjacent the closed end of the cylinder, the dispensing tube of the grease gun being screwed into the check valve body.

It has been proposed by U.S. Pat. No. 3,291,350 to mount the pump cylinder of a grease gun in diametrically opposite openings through the side wall of the head cap but in that case the outlet check valve is coaxially aligned with the cylinder bore and the link pivot integrally projects from the end wall of the head cap.

SUMMARY OF THE INVENTION

In contradistinction to the foregoing known forms of lever-operated grease guns the present invention provides a grease gun which is economical to manufacture and is of strong construction in that the round cross-section pump cylinder is positively mounted in the head cap against axial, lateral, and rotary movement. Moreover, a simple stamped clevis for the link of a pump-operating lever is not only welded to the end wall of the head cap but is positively retained by a shoulder of a check valve body against imposition of forces on the clevis tending to break it away from the end wall of the head cap when high pressure is applied on the grease by operation of the pump lever.

Other objects and advantages will appear from the ensuing description.

BRIEF DESCRIPTION OF THE DRAWING

FIG. 1 is a central longitudinal cross-section view of a lever-operated grease gun according to the present invention;

FIG. 2 is a view taken substantially along the line 2—2, FIG. 1; and

FIG. 3 is a view taken substantially along the line 3—3, FIG. 1.

DETAILED DESCRIPTION OF A PREFERRED EMBODIMENT

Grease gun 1 comprises a cylinder 2 adapted to be filled with grease as by installing a grease pump adapter (not shown) in the filler opening in the upper end wall 3 of a head cap 4 in place of screw plug 5; or by removing the head cap 4 either for insertion of a grease cartridge (not shown) into cylinder 2 or for sucking bulk grease from a pail into cylinder 2 by retracting plunger 8.

The rear end of the cylinder 2 is curled or rolled in to provide an inturned flange 6 and inserted into the cylinder 2 from the head end thereof is a unitary assembly 7 comprising a plunger 8 of elastomeric material in sliding sealed engagement with the interior wall of the cylinder 2, a pair of rings 9 and 10 on opposite sides of the plunger 8, a spring 11, an end cap 12, and a plunger rod 13 having a handle 14. When said assembly 7 is installed from the head end of the cylinder 2, the end cap 12 engages the inturned flange 6 at the rear end of the cylinder 2. The plunger rod 13 may comprise heavy gage wire which has sliding sealed engagement within the center bore of the plunger 8 and has integrally formed wings or projections 15 to retain the ring 9. The handle 14 may be a sheet metal stamping having an opening therethrough for the reduced end of the rod 13 which is staked or headed as shown with a spacer tube 16 between the handle 14 and the rear end cap 12. The ring 10 constitutes a plunger support and provides a seat for the spring 11, and a depression 17 in the rear end cap 12 provides a seat for the other end of the spring 11. The rear end cap 12 has a guide opening 18 for the plunger rod 13 which has a cutout 19 as shown to receive the notched portion 20 of the rod 13 when the latter, together with the plunger 8, is pulled down and tilted thus to retain the plunger 8 in downwardly retracted position.

The dispensing head assembly 21 comprises the sheet metal head cap 4 which has screw-threaded engagement with the head end of the cylinder 2 and which has a cylindrical extension 23 of reduced diameter to provide a shoulder 24 to receive a gasket 25 to seal the head cap 4-cylinder 2 connection when the head cap 4 is tightly screwed onto the cylinder 2. The reduced diameter extension 23 of the head cap 4 has diametrically opposite holes 26 and 27 therethrough for receiving the pump cylinder 28, the smaller hole 27 receiving the reduced diameter extension 29 at the blind end of the pump cylinder 28 for radial outward deformation as by staking of the cylinder 28 to the head cap 4 as shown. Thus, there are provided exterior and interior shoulders in straddling engagement with the side wall 23 around hole 27. If desired, the portion of the cylinder 28 which extends outwardly beyond the cap 4 may be sealed as by brazing or soldering as shown.

Secured as by welding at 30 to the top wall 3 of the head cap 4 is the base 31 of a clevis 32 which has upstanding portions to embrace opposite flats of the hex of a check valve body 33 which has a stem portion 34 extending through aligned holes in the base 31 of the clevis 32 and in the wall 3, said stem portion 34 being pressfitted into a cross bore adjacent the blind end of the pump cylinder 28. The lower end of the stem portion 34 is radially outwardly deformed as by staking as shown in FIG. 1 to form a shoulder which in conjunction with the shoulder 46 engaged with base 31 firmly anchors the check valve body 33 and the pump cylinder 28 to the head cap 4.

The clevis 32 provides a pivot 35 for a link 36 which is pivotally connected at 37 to the end of a piston operating lever 38. Slidably fitted in the pump cylinder bore 39 is a piston 40 which has its outer end pivotally connected at 41 to the lever 38, the pump cylinder 28 having an inlet opening 42 through which grease flows from cylinder 2 into the pump cylinder 28 when the end of the piston 40 uncovers the opening 42.

When there is grease in the cylinder 2 and when the notch 20 has been released from the cutout 19, the plunger rod 13 may be pushed into the cylinder 2 toward the dispensing head assembly 21. The spring 11 which is compressed between the rear end cap 12 and the plunger engaging ring 10 tends to constantly urge the plunger 8 upwardly to exert pressure on the grease to keep the head cap 4 filled with grease. When the lever 38 is swung away from the cylinder 2 to cause the piston 40 to move to the phantom line position, grease will enter the pump cylinder bore 39 through inlet 42 whereupon swinging of the lever 38 toward the cylinder 2 will displace the grease trapped in the cylinder bore 39 through the check valve 43 in the check valve body 33, through the dispensing tube 44 which is screwed into the check valve body 33 and through the grease fitting coupling 45 to inject the grease into a grease fitting (not shown).

It is to be noted that in the case of a blocked or frozen grease fitting where it is required to exert high pressure on the grease, the engagement of the shoulder 46 of the check valve body 33 with the base 31 of the clevis 32 will prevent the large forces applied on the clevis pivot 35 by the link 36 from tending to break the clevis 32 away from its welded connection 30 to the end wall 3 of the head cap 4. Likewise, the upstanding portions of the clevis 32 which embrace opposite flats of the check valve body hex prevent turning of the check valve body 33 when the dispensing tube 44 is screwed into or unscrewed from the check valve body 33.

When a grease cartridge (not shown) is inserted into the cylinder 2 (with plunger 8 latched in retracted position), the tapered annular portion of the plunger 8 when unlatched will be resiliently wedged into the cartridge to make sliding sealed engagement with the interior wall thereof thus to apply pressure on the grease for feeding it into the pump cylinder 28 when the inlet opening 42 is uncovered by the piston 40.

A further feature of the present invention is that the end cap 12 has a conical end wall to facilitate draining of paint therefrom during the painting operation. Moreover, when the rod 13 is pulled out and tilted for latching the rod 13 and plunger 8 in retracted position, the interengaged notch 20 and cutout 19 are inclined at about the same angle to resist inadvertent disengagement of the notch 20 from the cutout 19.

The embodiments of the invention in which an exclusive property or privilege is claimed are defined as follows:

1. A grease gun comprising a grease-containing cylinder having means for feeding grease therein toward one end of said cylinder; and a lever-operated piston pump assembly at said one end operative to pump grease fed thereto through a pump outlet passage; said assembly comprising a sheet metal head cap screwed onto said one end of said grease-containing cylinder and having a cylindrical side wall extending axially beyond said one end and terminating in a transverse end wall; a pump cylinder of circular cross-section secured in fluid tight relation in diametrically opposite holes in said side wall; said pump cylinder having an elongated central bore which is closed at one end of said pump cylinder and open through the other end; a piston inserted into the open end of said pump cylinder bore; a sheet metal clevis having a base secured by a welded area onto said end wall to extend diametrically thereacross in parallel relation to said pump cylinder and having upstanding portions providing a clevis pivot axially beyond said end wall; a link having one end pivotally connected to said clevis pivot; a lever pivotally connected at longitudinally spaced points thereof to the outer end portion of said piston and to the other end of said link; said pump cylinder having an inlet communicating the interior of said grease-containing cylinder with said bore when said piston uncovers said inlet during outward movement of said piston by swinging said lever away from said grease-containing cylinder; a check valve body having a cylindrical portion extending through aligned holes in said base and end wall remote from said welded area and extending through and secured in fluid tight relation in a cross bore of said pump cylinder adjacent the closed end thereof; said check valve body having shoulders at the ends of said cylindrical portion respectively engaging said base around the hole therein and said pump cylinder around said cross bore to retain said base against said end wall to prevent pulling apart of said base and end wall at said welded area upon application of large forces on said link as said lever is swung toward said grease-containing cylinder to move said piston inwardly toward said closed end to cover said inlet; said shoulder which engages said pump cylinder being defined by the radially outwardly deformed end of said cylindrical portion; said check valve body having a check valve therein through which grease is pumped to said pump outlet passage during movement of said piston toward the closed end of said pump cylinder.

2. The grease gun of claim 1 wherein the closed end of said pump cylinder has a neck within the side wall hole thereat defining exterior and interior shoulders in straddling engagement with said side wall to axially retain said pump cylinder without transmission of axial force where said open end extends through the side wall hole thereat, said exterior shoulder being defined by a radially outwardly deformed end portion of said pump cylinder.

3. The grease gun of claim 1 wherein said cylindrical portion of said check valve body has an interference fit in said cross bore to establish the fluid tight seal therewith.

4. The grease gun of claim 1 wherein said check valve body has said pump outlet passage into which a dispensing tube is screwed; and wherein said upstanding portions embrace flats on said check valve body adjacent to the base engaging shoulder to prevent turning of said check valve body during screwing or unscrewing of said dispensing tube.

* * * * *